(12) United States Patent
Beck et al.

(10) Patent No.: US 10,189,346 B2
(45) Date of Patent: Jan. 29, 2019

(54) PLANETARY MULTI-STAGE TRANSMISSION

(71) Applicant: ZF Friedrichshafen AG, Friedrichshafen (DE)

(72) Inventors: Stefan Beck, Eriskirch (DE); Johannes Kaltenbach, Friedrichshafen (DE); Uwe Griesmeier, Markdorf (DE); Matthias Horn, Tettnang (DE); Viktor Warth, Friedrichshafen (DE); Michael Wechs, Weißensberg (DE); Jens Moraw, Friedrichshafen (DE); Bernd Knöpke, Salem (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 95 days.

(21) Appl. No.: 15/534,509

(22) PCT Filed: Nov. 12, 2015

(86) PCT No.: PCT/EP2015/076373
§ 371 (c)(1),
(2) Date: Jun. 9, 2017

(87) PCT Pub. No.: WO2016/091525
PCT Pub. Date: Jun. 16, 2016

(65) Prior Publication Data
US 2017/0320386 A1    Nov. 9, 2017

(30) Foreign Application Priority Data

Dec. 12, 2014  (DE) .................. 10 2014 225 736

(51) Int. Cl.
*B60K 6/48* (2007.10)
*F16H 3/66* (2006.01)
(Continued)

(52) U.S. Cl.
CPC ............... *B60K 6/48* (2013.01); *B60K 6/365* (2013.01); *B60K 6/547* (2013.01); *F16H 3/66* (2013.01);
(Continued)

(58) Field of Classification Search
CPC .......... B60K 6/48; B60K 6/365; B60K 6/547; B60K 2006/4816; F16H 3/66;
(Continued)

(56) References Cited

U.S. PATENT DOCUMENTS

2007/0197335 A1* 8/2007 Raghavan ............ B60K 6/365
                                                                475/5
2007/0225097 A1* 9/2007 Raghavan ............ B60K 6/365
                                                                475/5
(Continued)

FOREIGN PATENT DOCUMENTS

DE  102009046367 A1 *  5/2011  ............... B60K 6/48
DE  102009046367 A1     5/2011
(Continued)

OTHER PUBLICATIONS

German Search Report DE102014225736.0, dated Dec. 9, 2015. (8 pages).
(Continued)

*Primary Examiner* — Jacob S. Scott
*Assistant Examiner* — Murad Jahmani
(74) *Attorney, Agent, or Firm* — Dority & Manning, P.A.

(57) ABSTRACT

A planetary multi-stage transmission for a vehicle is provided. A drive (An) is connectable by a zeroth shift element (K0) to a first shaft (1). A first element of a first planetary gear set (RS1) is connected to a housing (9). A first shaft (1) is permanently connected to a second element of the first planetary gear set (RS1). A rotor (10) of an electric motor (EM) is connected to a third element of the first planetary
(Continued)

gear set (RS1), and the third element of the first planetary gear set (RS1) is connectable by one or more of a plurality of additional shift elements to at least one element of one or more of a second and third planetary gear sets (RS2, RS3).

10 Claims, 5 Drawing Sheets

(51) Int. Cl.
  *B60K 6/365* (2007.10)
  *B60K 6/547* (2007.10)

(52) U.S. Cl.
  CPC ... *B60K 2006/4816* (2013.01); *B60Y 2200/92* (2013.01); *F16H 2200/006* (2013.01); *F16H 2200/201* (2013.01); *F16H 2200/2043* (2013.01); *F16H 2200/2097* (2013.01); *Y02T 10/6221* (2013.01); *Y02T 10/6256* (2013.01); *Y10S 903/911* (2013.01); *Y10S 903/919* (2013.01)

(58) Field of Classification Search
  CPC ......... F16H 2200/006; F16H 2200/201; F16H 2200/2043; F16H 2200/2097; B60Y 2200/92; Y02T 10/6221; Y02T 10/6256; Y10S 903/911; Y10S 903/919
  See application file for complete search history.

(56) References Cited

U.S. PATENT DOCUMENTS

| | | | | |
|---|---|---|---|---|
| 2008/0015073 A1* | 1/2008 | Raghavan | ................ | B60K 6/40 475/5 |
| 2009/0227417 A1* | 9/2009 | Imamura | ................ | B60K 6/445 477/5 |
| 2011/0015019 A1* | 1/2011 | Seo | ........................ | B60K 6/365 475/5 |
| 2011/0263370 A1* | 10/2011 | Borntraeger | ............ | B60K 6/26 475/5 |
| 2012/0322612 A1* | 12/2012 | Borntrager | ............... | B60K 6/48 477/20 |
| 2015/0330481 A1* | 11/2015 | Griesmeier | ............ | F16H 3/725 475/5 |

FOREIGN PATENT DOCUMENTS

| | | | | |
|---|---|---|---|---|
| DE | 102012219125 A1 * | 4/2014 | ............. | F16H 3/725 |
| DE | 102012219125 A1 | 4/2014 | | |
| DE | 102012025369 A1 * | 7/2014 | ............. | B60K 6/365 |
| DE | 102012025369 A1 | 7/2014 | | |
| WO | WO 2014/102030 A1 | 7/2014 | | |
| WO | WO-2014102030 A1 * | 7/2014 | ............. | B60K 6/365 |

OTHER PUBLICATIONS

International Search Report (English Translation) PCT/EP2015/076373, dated Jan. 11, 2016. (2 pages).

* cited by examiner

| Gear | Engaged Shifting Elements | | | | |
|---|---|---|---|---|---|
| | Brake | Clutches | | | |
| | B1 | K1 | K2 | K3 | K4 |
| G1 | X | | X | | |
| G2 | X | | | | X |
| G3 | X | X | | | |
| G4 | | X | | | X |
| G5 | | X | X | | |
| G6 | | X | | X | |
| G7 | | | X | X | |
| G8 | | | | X | X |

PLANETARY MULTI-STAGE TRANSMISSION

FIELD OF THE INVENTION

The present invention relates generally to a multi-stage transmission in planetary design for a vehicle comprising at least one electric motor and including several planetary gear sets.

BACKGROUND

Hybrid transmissions are known from automotive engineering. With such hybrid transmissions, a purely electric start-up, driving by purely electric means, starting the internal combustion engine from a purely electric driving mode and a so-called drag start are all possible. Furthermore, hybrid driving with a load point displacement is conceivable. In addition, it is known that the electric motor is connected to the transmission input shaft by an additional preceding gear ratio. As a result, the electric motor can be designed with less torque.

For example, the publication DE 10 2009 046 367 A1 discloses such a hybrid multi-stage transmission in planetary design with an additional preceding gear ratio for the electric motor. However, it has been found that connecting the electric motor by an additional preceding gear ratio requires a significant amount of installation space, which in turn increases not only the production costs, but also consumption.

SUMMARY OF THE INVENTION

In example aspects of the present invention, a multi-stage transmission where at least the aforementioned functions can be implemented is provided, and the multi-stage transmission may be constructed in a simple and economical way.

Thus, a multi-stage transmission in planetary design for a vehicle includes at least one electric motor and includes several planetary gear sets in a housing. A drive, for example, an internal combustion engine, can be connected to a first shaft, and the output of the transmission can be connected to a second shaft. Furthermore, there are provided additional shafts and several shift elements, the actuation of which allows several forward gears to be implemented.

In order to implement a transmission-integrated preceding gear ratio of the electric motor, the first element of the first planetary gear set is connected to the housing and that the first shaft is permanently connected to the second element of the first planetary gear set. Furthermore, the rotor of the electric motor is connected to the third element of the first planetary gear set. In addition, the third element of the first planetary gear set can be connected by at least one shift element to at least one element of at least one additional planetary gear set.

In this way, the electric motor is connected, on the one hand, to the transmission input shaft, i.e., to the drive, by a fixed gear-independent gear ratio, whereby, in each gear, the electric motor is connected to the transmission input shaft faster than the internal combustion engine. Thus, the electric motor can be designed with less torque, but with higher rotational speed, which has a particularly favorable effect on the production costs. On the other hand, there is the advantage that the fixed preceding gear ratio for the electric motor is generated by a transmission-integrated gear set, which is also involved in the creation of additional gear stages. Thus, the gear set that forms the preceding gear ratio is used multiple times and the installation space otherwise required for an additional set of gears as a preceding gear ratio is no longer needed.

For example, for the connection between the rotor of the electric motor and the third element of the first planetary gear set, it is possible to provide a direct connection, e.g., a coaxial arrangement of the electric motor and the third element of the first planetary gear set, in order to save installation space and components. However, it is also conceivable that an indirect connection, for example, by shafts and/or other components, such as, for example, gear ratio stages, chain drives or belt drives or the like, is provided, in order to enable, for example, a non-coaxial arrangement of the electric motor and the third element of the first gear set. This also applies to other connections in the multi-stage transmission according to example aspects of the invention.

An additional advantage associated with the proposed multi-stage transmission is that a mechanical reverse gear is not required in the transmission structure, since it is possible to drive in reverse with the electric motor, which then rotates backwards in a forward gear. Furthermore, it is advantageous that the electric motor can use the first gear ratio of the transmission and also be connected by the integrated preceding gear ratio, which results in a high starting torque for both travel in reverse and forward travel.

Therefore, the proposed multi-stage transmission may generally include three planetary gear set gear planes, when the planetary gear sets are arranged axially one behind the other. Furthermore, only six shift elements, including the shift element which connects the drive to the transmission input, are required, whereby for each gear ratio two connecting shift elements are provided at the same time. At the only six required shafts, a free wheel to the housing or to another shaft can in principle be arranged on each shaft.

According to a variant of the present invention that requires less installation space, two of the planetary gear sets may be arranged radially one behind the other, so that the nested gear sets generally form a common gear plane. In this way, one gear plane is effectively eliminated and less axial installation space is needed.

Preferably, the multi-stage transmission may include a brake as a shift element and five shift elements that are designed as clutches, whereby preferably a housing fixed coupling of an element of one of the planetary gear sets is provided as an additional housing support.

As used herein, the term "shift element" is defined as a shiftable connection between two elements of the transmission, whereby the torque that is to be transmitted between these two elements is transmitted by a force locking or, more specifically, a frictional engagement, or by a positively locking engagement. If both elements of the shiftable connection are designed in a manner that allows rotation, then the shift element is referred to as a clutch; if only one of the two elements of the shiftable connection rotates, then the shift element is referred to as a brake.

Moreover, the position or, more specifically, the order of the individual shift elements can be freely chosen, as long as the connectivity of the elements allows it. In this way, the position of individual elements can be changed as desired.

Exemplary embodiments of a force-locking shift element are multi-disk clutches or multi-disk brakes, band brakes, cone clutches or cone brakes, electromagnetic clutches, magnetic particle clutches and electrorheological clutch. Exemplary embodiments of a positive-locking shift element are dog clutches or claw brakes and toothed clutches.

Thus, both friction-locking and positive-locking shift elements can be used in general as shift elements. Preferably, owing to its characteristic as a connection between the drive and the transmission, in particular the zeroth shift element, which is designed as a clutch, can be configured as a dry or wet multi-disk clutch to allow a drag start. The fifth shift element, which is designed as a brake, may be configured preferably as a positive-locking shift element, for example, as a claw, a synchronization, or the like.

The planetary gear sets are arranged, when viewed in the axial direction, in the sequence of first planetary gear set, second planetary gear set and third planetary gear set, wherein preferably all of the gear sets are provided as minus or negative planetary gear sets. However, at points, where the connections so permit, one or more of the minus planetary gear sets can be changed to plus or positive planetary gear sets, if at the same time the web connection and the ring gear connection are exchanged, and the amount of the standard gear ratio is increased by the value 1. A minus planetary gear set has, as is well-known, planetary gears, which are mounted on the planetary gear carrier in a rotatable manner and which mesh with the sun gear and the ring gear of this planetary gear set, so that, when the planetary gear carrier is held tight and the sun gear is rotating, the ring gear rotates in the direction opposite to the direction of rotation of the sun gear. A plus planetary gear set has, as is also well-known, inner and outer planetary gears, which are in mesh with one another and which are mounted on the planetary gear carrier of the plus planetary gear set in a rotatable manner, whereby the sun gear of this planetary gear set meshes with the inner planetary gears and the ring gear of this planetary gear set meshes with the outer planetary gears, so that, when the planetary gear carrier is held tight and the sun gear is rotating, the ring gear rotates in the same direction as the direction of rotation of the sun gear.

The geometric location or the sequence of the individual planetary gear sets and shift elements can be freely chosen, provided that the connectivity of the elements permits it. Thus, for example, the position of the individual elements can be moved as desired.

The proposed multi-stage transmission can also be carried out in a coaxial design, in which the drive and the output are arranged coaxially to each other. However, it is also conceivable that a lateral output for a front transverse or a rear transverse arrangement in the vehicle may be provided.

BRIEF DESCRIPTION OF THE DRAWINGS

The present invention is explained in more detail below with reference to the drawings. In the drawings.

DETAILED DESCRIPTION

Figure 1:
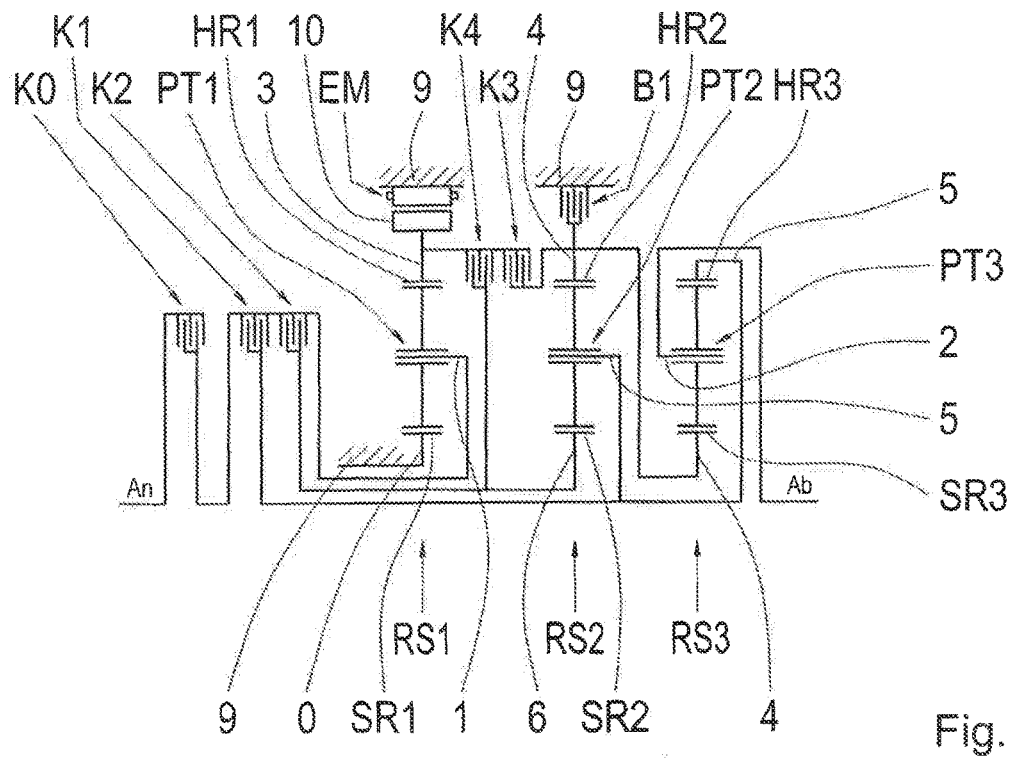
FIG. 1 shows a schematic view of a first design variant of the invented multi-stage transmission in planetary design with a coaxial drive and output.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 7:
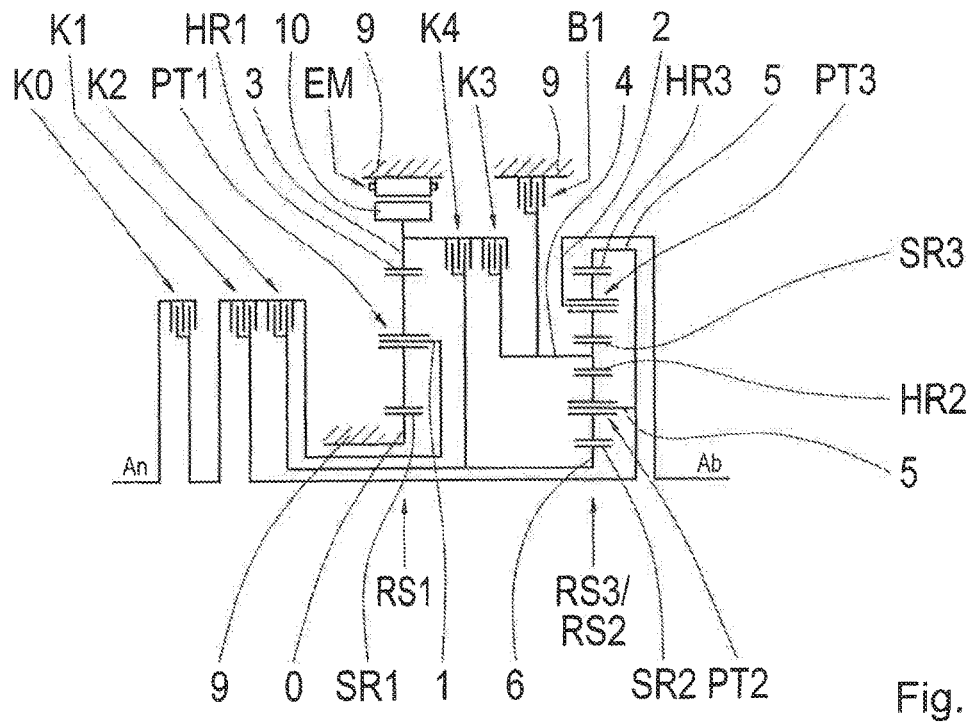
FIG. 7 shows a schematic view of the first design variant with nested second and third planetary gear sets.
Figure 8:
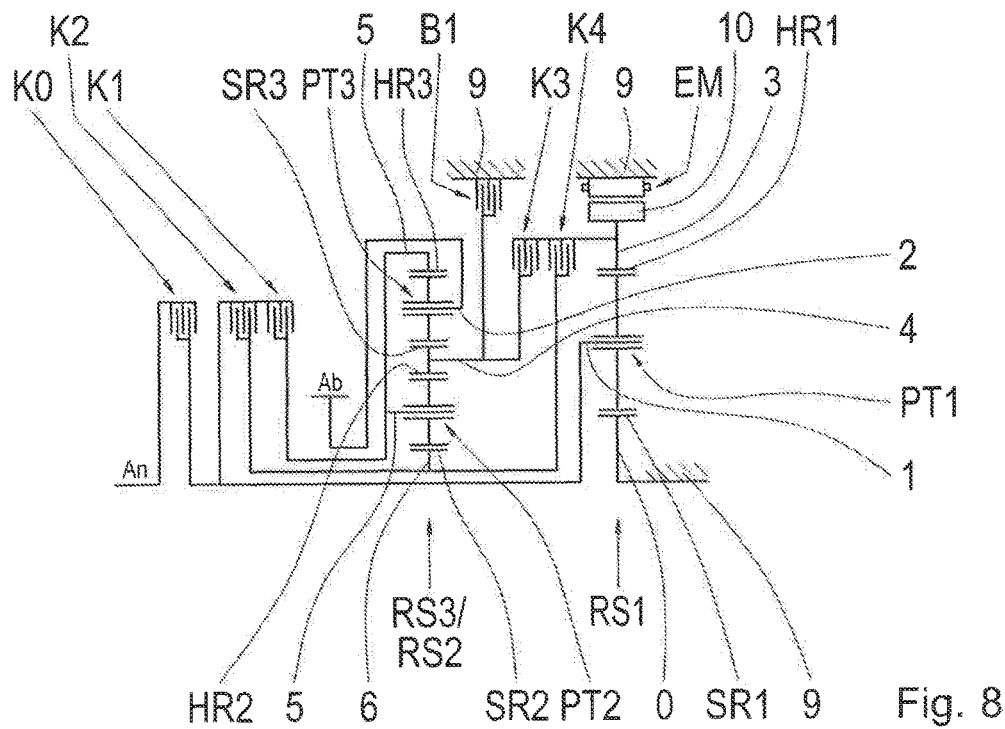
FIG. 8 shows a schematic view of the second design variant with nested second and third planetary gear sets.
Figures 9, 10:
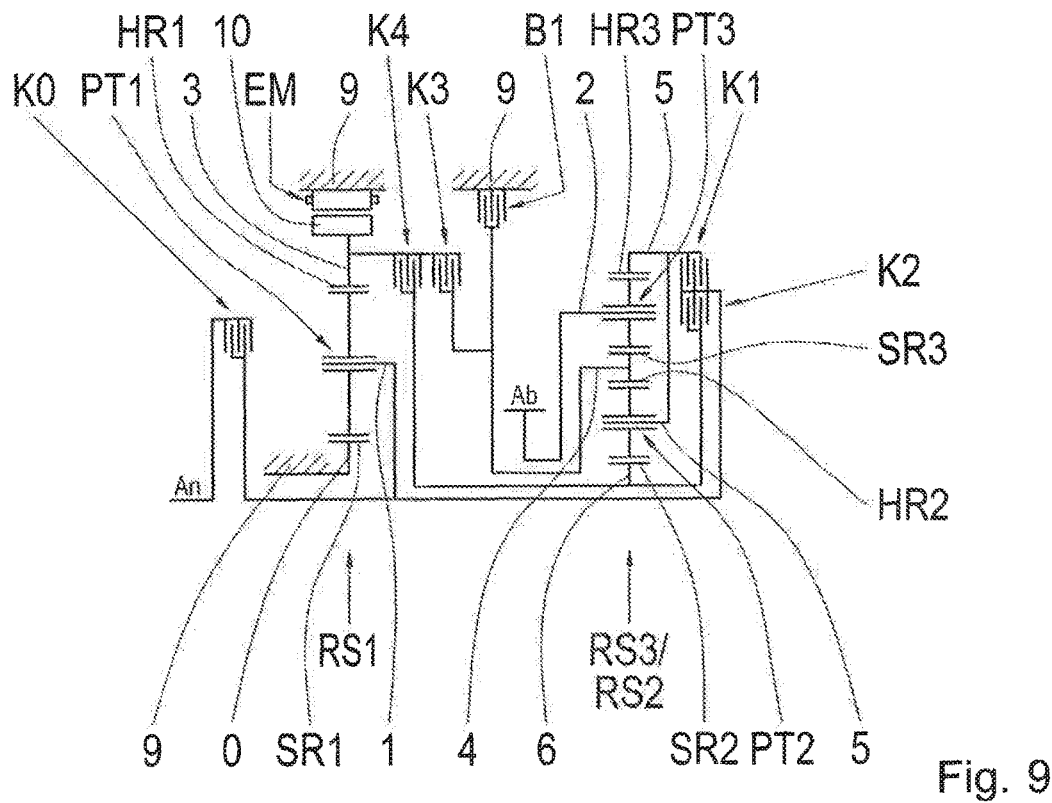
FIG. 9 shows an additional schematic view of the second design variant with nested second and third planetary gear sets.
FIG. 10 shows an engagement sequence that is given as an example for all the exemplary embodiments and configurations according to FIGS. 1 to 9.

FIGS. 1 to 9 show various embodiments of the multi-stage transmission in planetary design according to example aspects of the invention, for example, as an automatic eight speed transmission or, more specifically, an automatic transmission for a vehicle, in particular a motor vehicle, whereby FIG. 10 shows one example of an engagement sequence to implement the various gear stages.

Independently of the respective embodiments, the multi-stage transmission is shown as a gear set with a housing 9 only in schematic form. Also indicated in schematic form are the drive An, for example as an internal combustion engine, and the output Ab. The proposed multi-stage transmission includes six shafts 1, 2, 3, 4, 5, 6 and a fixed housing coupling 0. Furthermore, at least one electric motor EM as well as a first planetary gear set RS1, a second planetary gear set RS2 and a third planetary gear set RS3 are provided, whereby the drive An, provided for example as an internal combustion engine, can be connected to a first shaft 1 by a zeroth shift element K0, which is designed as a clutch, and an output Ab is connected to a second shaft 2.

In order to select the at least eight forward gears G1, G2, G3, G4, G5, G6, G7, G8 that are provided: a first shift element K1, which is designed as a clutch; a second shift element K2, which is designed as a clutch; a third shift element K3, which is designed as a clutch; a fourth shift element K4, which is designed as a clutch; and a fifth shift element B1, which is designed as a brake, are provided. The at least one reverse gear ratio R is implemented electrically by the backwards rotating electric motor EM with the aid of a forward gear. A gear stage to reverse the direction of rotation is therefore not needed.

In order to implement a preceding gear ratio of the electric motor EM, it is provided, independently of the various design variants, that the first element of the first planetary gear set RS1 is permanently connected to the housing 9 by the fixed housing coupling 0. Furthermore, the first shaft 1, which can be connected to the drive An or, more specifically, to the internal combustion engine, is permanently connected to the second element of the first planetary gear set RS1. Finally, the rotor 10 of the electric motor EM is connected to the third element of the first planetary gear set RS1. In order to achieve the dual function of the preceding gear ratio so that it can also be used for an additional transmission ratio, the third element of the first planetary gear set RS1 can be connected by at least one shift element K3, K4 to at least one element of at least one additional planetary gear set RS2, RS3.

In the case of the gear set of the invention, it is provided that the rotor 10 of the electric motor EM and the third element of the first planetary gear set RS1 are permanently connected, for example, to the third shaft 3, whereby the rotor 10 can also be connected by other elements for reasons relating to the arrangement of the electric motor EM. In this way the first planetary gear set RS1 forms a transmission internal preceding gear ratio for the electric motor EM, whereby the third shaft 3 transmits a constant preceding gear ratio to the first shaft 1.

Preferably, the third shaft 3 can be connected by the third shift element K3, which is designed as a clutch, and by the fourth shaft 4 to the third element of the second planetary gear set RS2 and to the first element of the third planetary gear set RS3. Furthermore, the third shaft 3 can be connected by the fourth shift element K4, which is designed as a clutch, and by the sixth shaft 6 to the first element of the second planetary gear set RS2.

Furthermore, the first element of the third planetary gear set RS3 and the third element of the second planetary gear set RS2 are permanently connected to the fourth shaft 4, and the first element of the second planetary gear set RS2 is permanently connected to the sixth shaft 6. In addition, the third element of the third planetary gear set RS3 and the second element of the second planetary gear set RS2 are permanently connected to the fifth shaft 5, and the second element of the third planetary gear set RS3 and the output Ab are permanently connected to the second shaft 2, whereby "permanently connected" generally means that a shiftable connection is not provided.

With respect to the shift elements involved in the gear ratios, it is provided that the first shift element K1 is designed as a clutch and connects the first shaft 1 to the fifth shaft 5 in an engaged or, more specifically, switched state. The second shift element K2 is designed as a clutch and connects the first shaft 1 to the sixth shaft 6 in the engaged state. The third shift element K3 is designed as a clutch and connects the third shaft 3 to the fourth shaft 4 in the engaged state. The fourth shift element K4 is designed as a clutch and connects the third shaft 3 to the sixth shaft 6 in the engaged state. Finally the fifth shift element B1 is designed as a brake and connects the fourth shaft 4 to the housing 9 in the engaged state.

In summary, all of the example embodiments exhibit a particularly compact design due to the integrated preceding gear ratio of the electric motor EM, which is also involved in other gear ratios. The proposed connections between the individual gear sets RS1, RS2, RS3 result in low mechanical load of the components and lower transmission losses due to the good gearing efficiency. Furthermore, an optimized series of gear ratios is implemented in the gear ratios that are provided.

Figure 2:
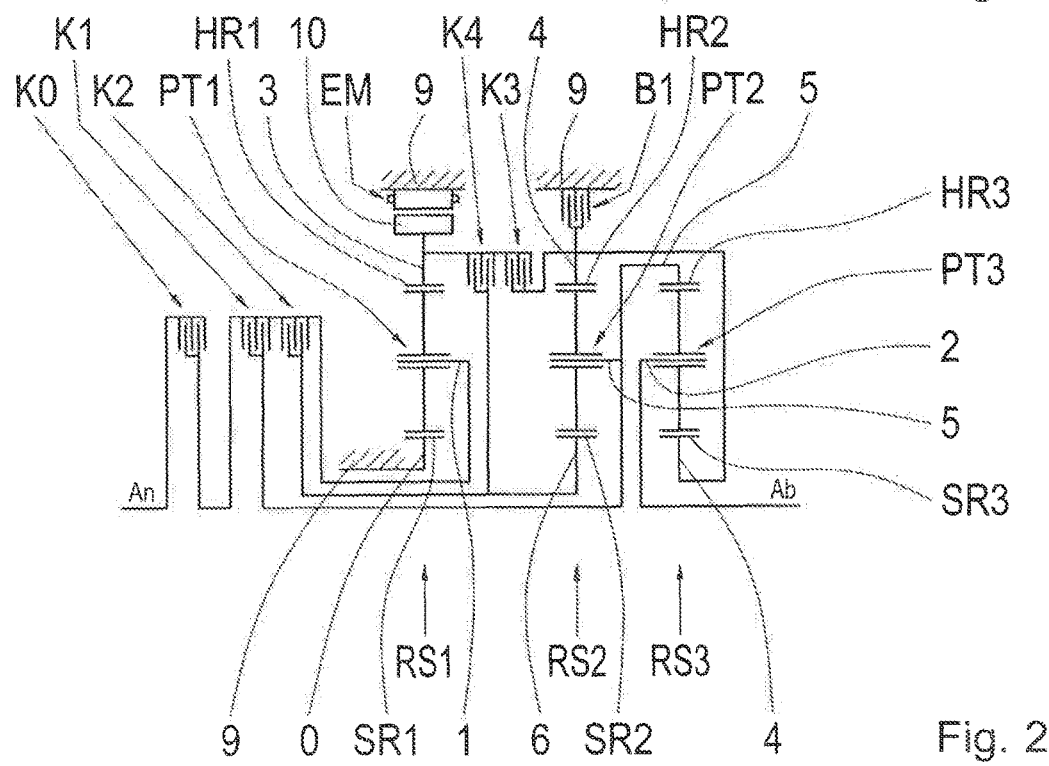
FIG. 2 shows a schematic view of an alternative embodiment of the first design variant.
Figure 3:
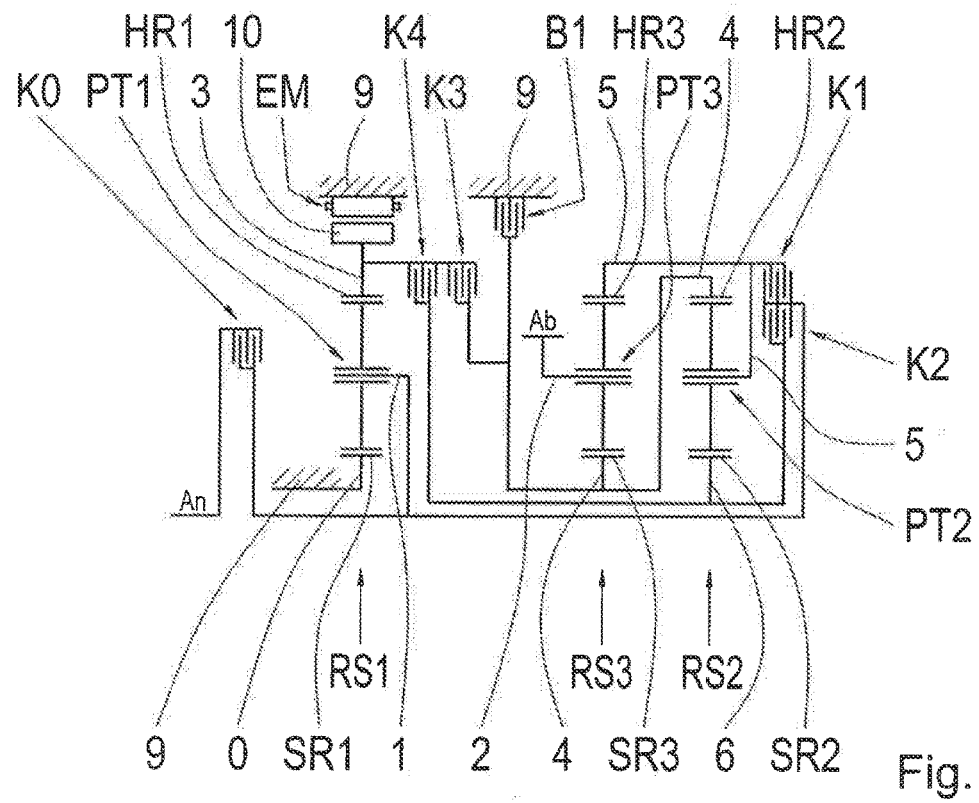
FIG. 3 shows schematic view of a second design variant of the multi-stage transmission with a lateral output.
Figure 4:
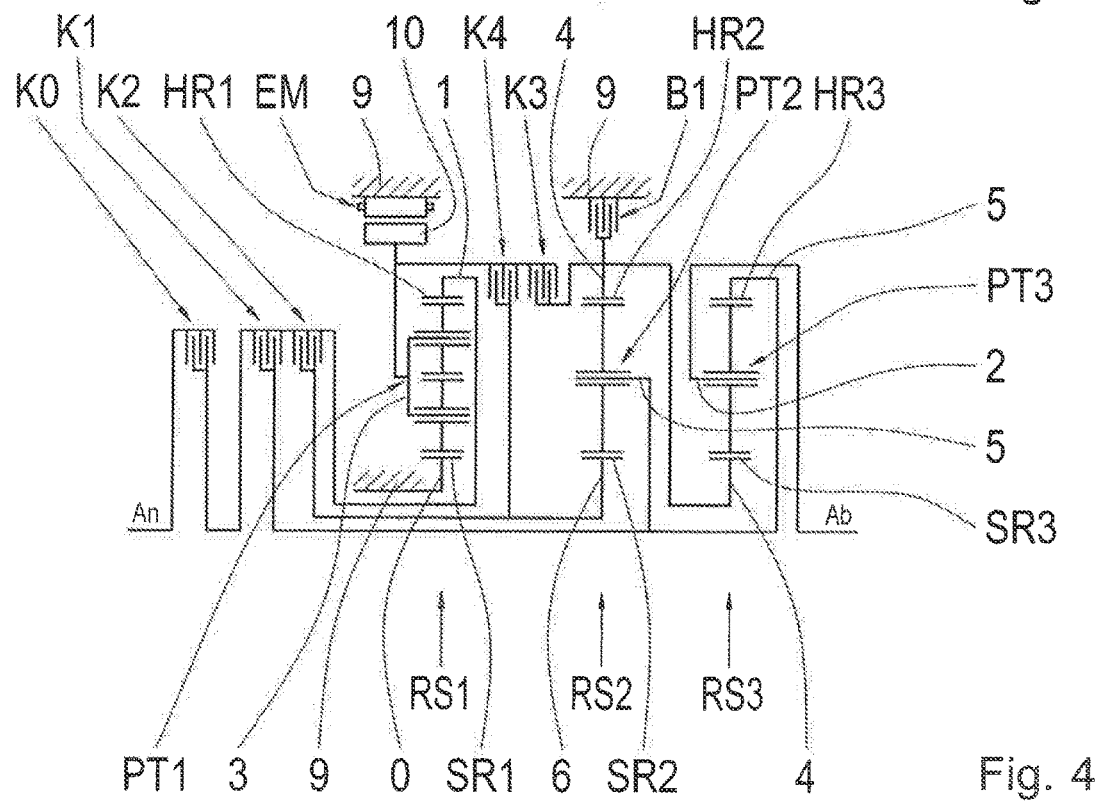
FIG. 4 shows a schematic view of the first design variant with a first planetary gear set designed as a plus planetary gear set.
Figure 5:
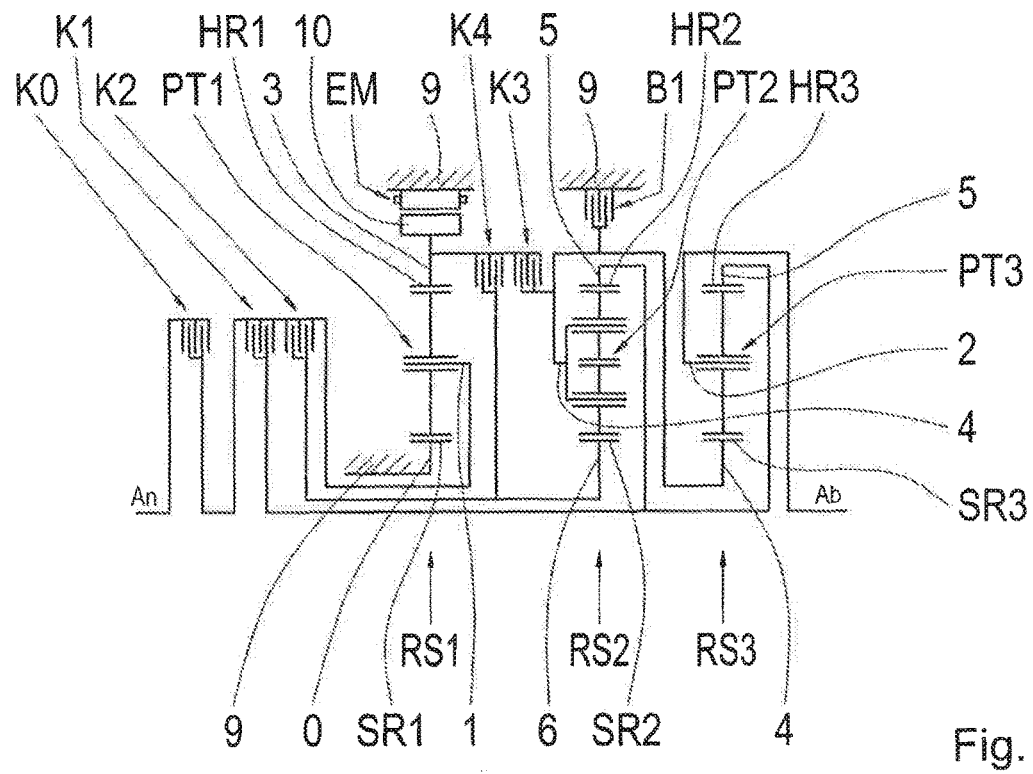
FIG. 5 shows a schematic view of the first design variant with a second planetary gear set designed as a plus planetary gear set.
Figure 6:
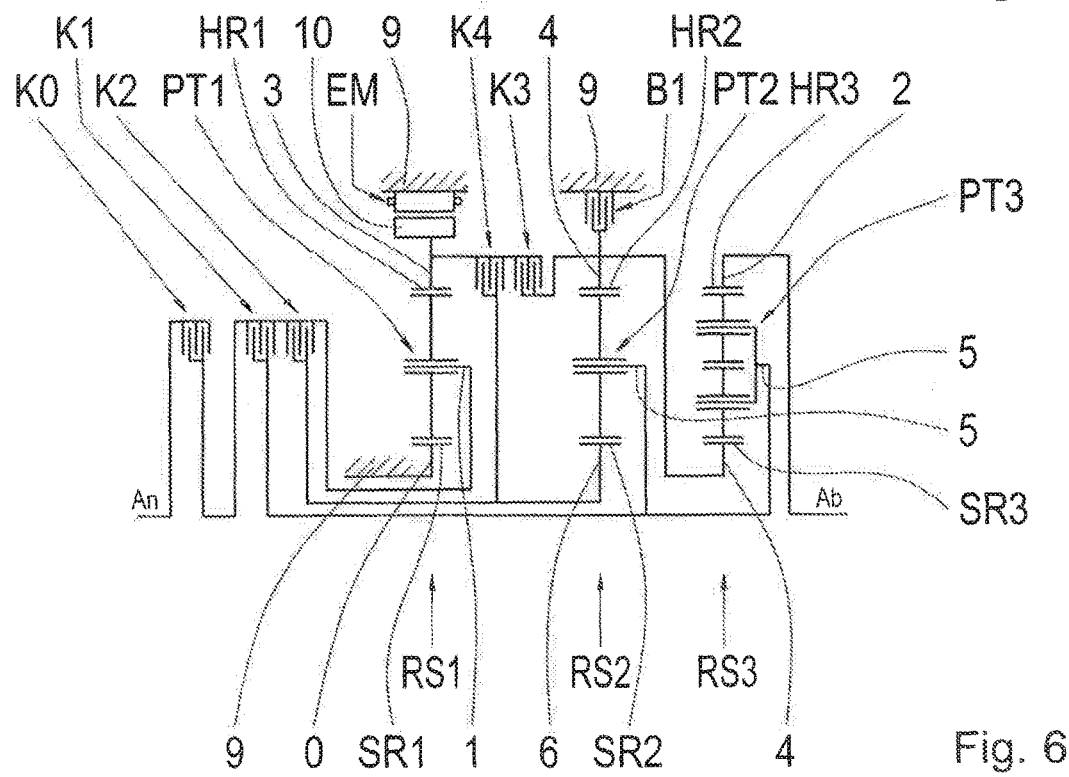
FIG. 6 shows a schematic view of the first design variant with a third planetary gear set designed as a plus planetary gear set.

FIGS. 1 to 3 show various schematic views of the invented gear set, in which each one of the three planetary gear sets RS1, RS2, RS3 is designed as a negative or minus Fig. gear set. FIG. 4 shows an alternative of the first design variant from FIG. 1, in which the multi-stage transmission has a positive or plus planetary gear set as a first planetary gear set RS1. FIG. 5 shows an alternative, in which the second planetary gear set RS2 is designed as a plus planetary gear set. Finally, FIG. 6 shows an embodiment, in which the third planetary gear set RS3 is designed as a plus planetary gear set.

FIG. 7 shows a nested arrangement of the second and third planetary gear sets RS2 and RS3 with the drive An and the output Ab in a coaxial arrangement according to the first design variant. In this case, the elements of the second planetary gear set RS2 and the third planetary gear set RS3 are generally arranged in a common gear plane, whereby the third planetary gear set RS3 is disposed radially outside the second planetary gear set RS2. This type of arrangement has the advantage that the first element of the third planetary gear set RS3 and the third element of the second planetary gear set RS2 are assigned to a common shaft.

In the embodiment shown in FIG. 7, the first planetary gear set RS1 forms the first gear plane, and the second planetary gear set RS2 and the third planetary gear set RS3 form a second gear plane, which lies axially behind the first gear plane.

FIG. 8 also shows, by way of an example, a nested arrangement of the second planetary gear set RS2 and the third planetary gear set RS3 with a laterally arranged output Ab according to the second design variant. In this case, the nested planetary gear sets RS2 and RS3 form the first gear plane and, located axially behind said first gear plane, the second gear plane is formed by the first planetary gear set RS1, to which the electric motor is also assigned. As a result, the electric motor EM is also located, when viewed axially, behind the first gear plane.

FIG. 9 shows another nested arrangement of the second planetary gear set RS2 and the third planetary gear set RS3. In contrast to the embodiment shown in FIG. 8, the first planetary gear set RS1 forms the first gear plane and the second planetary gear set RS2 with the third planetary gear set RS3 forms the second gear plane, located axially behind said first gear plane.

In the case of a minus planetary gear set, the first element is designed as a sun gear SR1, SR2, SR3, the second element is designed as a planetary gear carrier or, more specifically, a web PT1, PT2, PT3, and the third element is designed as a ring gear HR1, HR2, HR3. In the case of a plus planetary gear set, the first element is designed as a sun gear SR1, SR2, SR3, the second element as a ring gear HR1, HR2, HR3, and the third element as a planetary gear carrier or, more specifically, a web PT1, PT2, PT3.

The distinction between the first design variants according to FIGS. 1 and 2 and the second design variant according to FIG. 3 lies in the fact that in the second design variant the sequence of the planetary gear sets RS1, RS2, RS3 is changed. In the second design variant, starting from the drive side, the first planetary gear set RS1 as the first gear plane, the third planetary gear set RS3 as the second gear plane, and the second planetary gear set RS2 as the third gear plane are arranged axially one behind the other. This arrangement makes it possible to implement a lateral output Ab, with which the multi-stage transmission of the invention allows a front transverse arrangement or a rear transverse arrangement in the vehicle.

If the planetary gear sets RS1, RS2, RS3 are each designed as minus planetary gear sets, then the shafts 1, 2, 3, 4, 5, 6 in the multi-stage transmission of the invention are connected to the gear sets RS1, RS2, RS3 as follows.

The drive An can be connected by the zeroth shift element K0 to the first shaft 1. The first shaft 1 is permanently connected to the planetary gear carrier PT1 of the first planetary gear set RS1. The sun gear SR1 of the first planetary gear set RS1 is connected to the housing 9. The rotor 10 of the electric motor EM is connected to the ring gear HR1 of the first planetary gear set RS1. The rotor 10 of the electric motor EM and the ring gear HR1 of the first planetary gear set RS1 are permanently connected to the third shaft 3, whereby the third shaft 3 can be connected by the third shift element K3, which is designed as a clutch, and by the fourth shaft 4 to the ring gear HR2 of the second planetary gear set RS2 and to the sun gear SR3 of the third planetary gear set RS3. Furthermore, the third shaft 3 can be connected by the fourth shift element K4, which is designed as a clutch, and by the sixth shaft 6 to the sun gear SR2 of the second planetary gear set RS2. Furthermore, the sun gear SR3 of the third planetary gear set RS3 and the ring gear HR2 of the second planetary gear set RS2 are permanently connected to the fourth shaft 4. The sun gear SR2 of the second planetary gear set RS2 is permanently connected to the sixth shaft 6, whereby the ring gear HR3 of the third planetary gear set RS3 and the planetary gear carrier PT2 of the second planetary gear set RS2 are permanently connected to the fifth shaft 5. The planetary gear carrier PT3 of the third planetary gear set RS3 and the output Ab are permanently connected to the second shaft 2.

In the nested arrangements according to FIGS. 7 to 9, the connection between the ring gear HR2 of the second planetary gear set RS2 and the sun gear SR3 of the third planetary gear set occurs between the second planetary gear set RS2 and the third planetary gear set RS3 when they are designed as minus planetary gear sets. The result is a common component HR2/SR3, in which, on the one hand, an internal toothing is provided for the ring gear H2, and an external toothing is provided for the sun gear SR3, whereby the common component HR2/SR3 is connected to the shaft 4.

If one or more of the planetary gear sets RS1, RS2, RS3 is/are designed as a plus planetary gear set, then the aforementioned connection also applies, whereby it is not the planetary gear carrier PT1, PT2, PT3 that is provided as the second element of the planetary gear set, which is designed as a plus planetary gear carrier, but rather the ring gear HR1, HR2 HR3; and it is not the ring gear HR1, HR2, HR3 that is provided as the third element, but rather the planetary gear carrier PT1, PT2, PT3.

The following gear ratios result from the engagement sequence shown in FIG. 10. In order to implement the first forward gear G1, the fifth shift element B1, which is designed as a brake, and the second shift element K2, which is designed as a clutch, are engaged, whereby, in order to select the second forward gear G2, the fifth shift element B1, which is designed as a brake, and the fourth shift element K4, which is designed as a clutch, are engaged. In order to select the third forward gear G3, the fifth shift element B1, which is designed as a brake, and the first shift element K1, which is designed as a clutch, are engaged, whereby, in order to select the fourth forward gear G4, the first shift element K1, which is designed as a clutch, and the fourth shift element K4, which is designed as a clutch, are engaged. In order to select the fifth forward gear G5, the first shift element K1, which is designed as a clutch, and the second shift element K2, which is designed as a clutch, are engaged, whereby in order to select the sixth forward gear G6, the first shift element K1, which is designed as a clutch, and the third shift element K3, which is designed as clutch, are engaged. In order to select the seventh forward gear G7, the second shift element K2, which is designed as a clutch, and the third shift element K3, which is designed as a clutch, are engaged, whereby, in order to select the eighth forward gear G8, the third shift element K3, which is designed as a clutch, and the fourth shift element K4, which is designed as a clutch, are engaged. The reverse gear R is implemented electrically by one of the forward gear ratios.

Modifications and variations can be made to the embodiments illustrated or described herein without departing from the scope and spirit of the invention as set forth in the appended claims.

REFERENCE NUMERALS 0 fixed housing coupling
1 shaft
2 shaft
3 shaft
4 shaft
5 shaft
6 shaft
9 housing
10 rotor
EM electric motor
HR1 ring gear of the first planetary gear set
PT1 planetary gear carrier of the first planetary gear set
SR1 sun gear of the first planetary gear set
HR2 ring gear of the second planetary gear set
PT2 planetary gear carrier of the second planetary gear set
SR2 sun gear of the second planetary gear set
HR3 ring gear of the third planetary gear set
PT3 planetary gear carrier of the third planetary gear set
SR3 sun gear of the third planetary gear set
HR2/SR3 common component as ring gear and sun gear
G1 first forward gear
G2 second forward gear
G3 third forward gear
G4 fourth forward gear
G5 fifth forward gear
G6 sixth forward gear
G7 seventh forward gear
G8 eighth forward gear
R electrically implemented reverse gear
An drive
Ab output
K0 zeroth shift element as a clutch
K1 first shift element as a clutch
K2 second shift element as a clutch
K3 third shift element as a clutch
K4 fourth shift element as a clutch
B1 fifth shift element as a brake

The invention claimed is:

1. A planetary multi-stage transmission for a vehicle, comprising:
    a housing (9);
    at least one electric motor (EM);
    three planetary gear sets including a first planetary gear set (RS1), a second planetary gear set (RS2) and a third planetary gear set (RS3);
    a drive (An) connectable by a zeroth shift element (K0) to a first shaft (1);
    an output (Ab) connected to a second shaft (2);
    four additional shafts including a third shaft (3), a fourth shaft (4), a fifth shaft (5) and a sixth shaft (6); and
    a plurality of additional shift elements including a first shift element (K1), a second shift element (K2), a third shift element (K3), a fourth shift element (K4) and a fifth shift element (B1), the plurality of additional shift elements actuatable to provide at least eight forward gears (G1, G2, G3, G4, G5, G6, G7, G8);
    wherein a first element of the first planetary gear set (RS1) is connected to the housing (9), the first shaft (1) is permanently connected to a second element of the first planetary gear set (RS1), a rotor (10) of the electric motor (EM) is connected to a third element of the first planetary gear set (RS1), and the third element of the first planetary gear set (RS1) is connectable by one or more of the plurality of additional shift elements to at least one element of one or more of the second and third planetary gear sets (RS2, RS3).

2. The planetary multi-stage transmission of claim 1, wherein the rotor (10) of the electric motor (EM) and the third element of the first planetary gear set (RS1) are permanently connected to the third shaft (3), the third shaft (3) is connectable to a third element of the second planetary gear set (RS2) and to a first element of the third planetary gear set (RS3) by the third shift element (K3) and by the fourth shaft (4), the third shift element (K3) is a clutch, the third shaft (3) is connectable to a first element of the second planetary gear set (RS2) by the fourth shift element (K4) and by the sixth shaft (6), and the fourth shift element (K4) is a clutch.

3. The planetary multi-stage transmission of claim 2, wherein the first element of the third planetary gear set (RS3) and the third element of the second planetary gear set (RS2) are permanently connected to the fourth shaft (4), the first element of the second planetary gear (RS2) is permanently connected to the sixth shaft (6), a third element of the third planetary gear set (RS3) and a second element of the second planetary gear set (RS2) are permanently connected to the fifth shaft (5), and a second element of the third planetary gear set (RS3) and the output (Ab) are permanently connected to the second shaft (2).

4. The planetary multi-stage transmission of claim 1 wherein the first shift element (K1) is a clutch and connects the first shaft (1) to the fifth shaft (5) when the first shift element (K1) is engaged, the second shift element (K2) is a clutch and connects the first shaft (1) to the sixth shaft (6) when the second shift element (K2) is engaged; the third shift element (K3) is a clutch and connects the third shaft (3) to the fourth shaft (4) when the third shift element (K3) is engaged, the fourth shift element (K4) is a clutch and connects the third shaft (3) to the sixth shaft (6) when the fourth shift element (K4) is engaged, and the fifth shift element (B1) is a brake and connects the fourth shaft (4) to the housing (9) when the fifth shift element (B1) is engaged.

5. The planetary multi-stage transmission of claim 1, wherein the zeroth shift element (K0) is a clutch and connects the drive (An) to the first shaft (1) when the zeroth shift element (K0) is engaged in order to drive by an internal combustion engine.

6. The planetary multi-stage transmission of claim 1, wherein, when the three planetary gear sets (RS1, RS2, RS3) are minus planetary gear sets, a first element of each of the three planetary gear sets (RS1, RS2, RS3) is a sun gear (SR1, SR2, SR3), a second element of each of the three planetary gear sets (RS1, RS2, RS3) is a planetary gear carrier (PT1, PT2, PT3), and a third element of each of the three planetary gear sets (RS1, RS2, RS3) is a ring gear (HR1, HR2, HR3).

7. The planetary multi-stage transmission of claim 1, wherein, when the three planetary gear sets (RS1, RS2, RS3) are plus planetary gear sets, a first element of each of the three planetary gear sets (RS1, RS2, RS3) is a sun gear (SR1, SR2, SR3), a second element of each of the three planetary gear sets (RS1, RS2, RS3) is a ring gear (HR1, HR2, HR3), and a third element of each of the three planetary gear sets (RS1, RS2, RS3) is a planetary gear carrier (PT1, PT2, PT3).

8. The planetary multi-stage transmission of claim 1, wherein the three planetary gear sets (RS1, RS2, RS3) are arranged axially one behind the other and form three gear planes.

9. The planetary multi-stage transmission of claim 1, wherein the second planetary gear set (RS2) and the third planetary gear set (RS3) are arranged radially one behind the other, so that the second planetary gear set (RS2) and the third planetary gear set (RS3) form a common gear plane.

10. The planetary multi-stage transmission of claim 1, wherein:
in a first forward gear (G1), the fifth shift element (B1) and the second shift element (K2) are engaged;
in a second forward gear (G2), the fifth shift element (B1) and the fourth shift element (K4) are engaged;
in a third forward gear (G3), the fifth shift element (B1) and the first shift element (K1) are engaged;
in a fourth forward gear (G4), the first shift element (K1) and the fourth shift element (K4) are engaged;
in a fifth forward gear (G5), the first shift element (K1) and the second shift element (K2) are engaged;
in the sixth forward gear (G6), the first shift element (K1) and the third shift element (K3) are engaged;
in the seventh forward gear (G7), the second shift element (K2) and the third shift element (K3) are engaged;
in an eighth forward gear (G8), the third shift element (K3) and the fourth shift element (K4) are engaged; and
the first, second, third and fourth shift elements (K1, K2, K3, K4) are clutches and the fifth shift element (B1) is a brake.

* * * * *